United States Patent [19]

Schofield et al.

[11] Patent Number: 4,572,538

[45] Date of Patent: Feb. 25, 1986

[54] TRAILER COUPLING DEVICE

[75] Inventors: Charles P. Schofield, Greenfield; Arthur L. Wilkin, Hitchin, both of England

[73] Assignee: National Research Development Corporation, London, England

[21] Appl. No.: 617,732

[22] Filed: Jun. 6, 1984

[51] Int. Cl.⁴ .............................................. B60D 1/00
[52] U.S. Cl. ............................................... 280/478 R
[58] Field of Search .................... 280/495, 496, 479 R, 280/479 A, 478 A, 478 B, 478 R

[56] References Cited

U.S. PATENT DOCUMENTS 3,774,943 11/1973 Schmiesing ...................... 180/479 R
3,863,955  2/1975 Muncke et al. ................. 280/479 A
4,360,216 11/1982 Wiemers .......................... 280/479 R

FOREIGN PATENT DOCUMENTS 1455504  8/1969 Fed. Rep. of Germany ... 280/479 A
 734062 10/1932 France ............................ 280/479 R
1014954 12/1965 United Kingdom ........... 280/479 A Primary Examiner—John A. Pekar
Attorney, Agent, or Firm—Cushman, Darby & Cushman

[57] ABSTRACT

A coupling device for hitching a trailer to a vehicle such as an agricultural tractor comprises a frame for attachment to the underside of the vehicle, and a guideway carried by the frame which can be moved (e.g. pivotally) downwardly when the frame is attached under the vehicle. The guideway is adapted to receive and guide a trailer-mounted tow-bar assembly from a rearward to a forward location. When in the forward location, which is preferably in front of the vehicle's rear axle, latching means can be actuated to lock the tow-bar assembly in its forward location. The latching means can be actuated by upward movement of the guideway. The coupling device includes provision for pitch, roll and yaw movements between vehicle and trailer.

15 Claims, 7 Drawing Figures

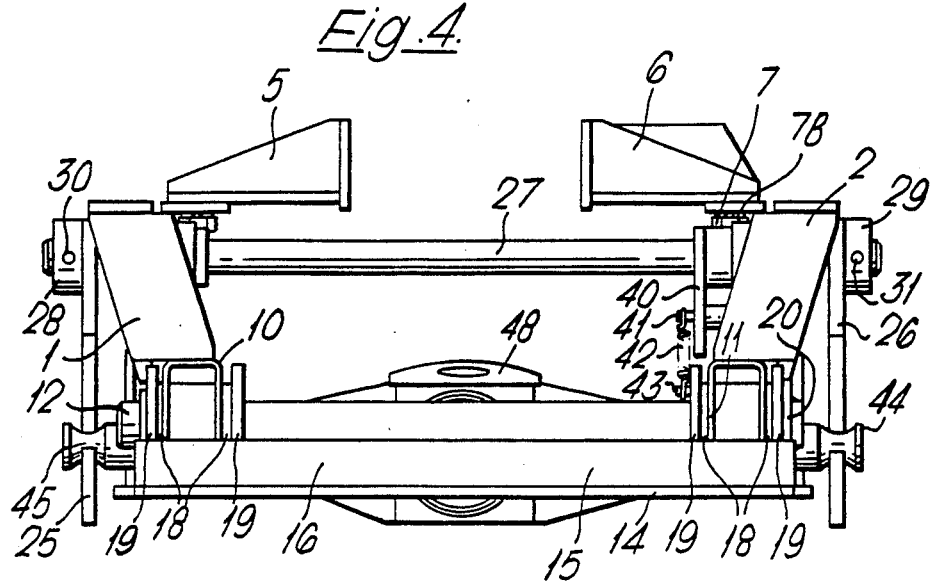
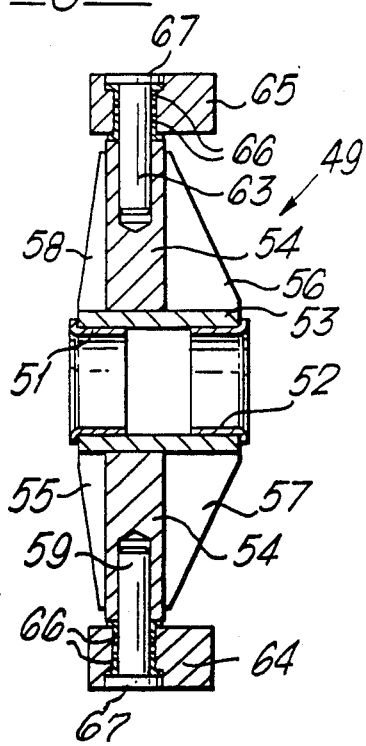
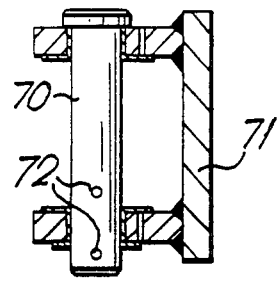

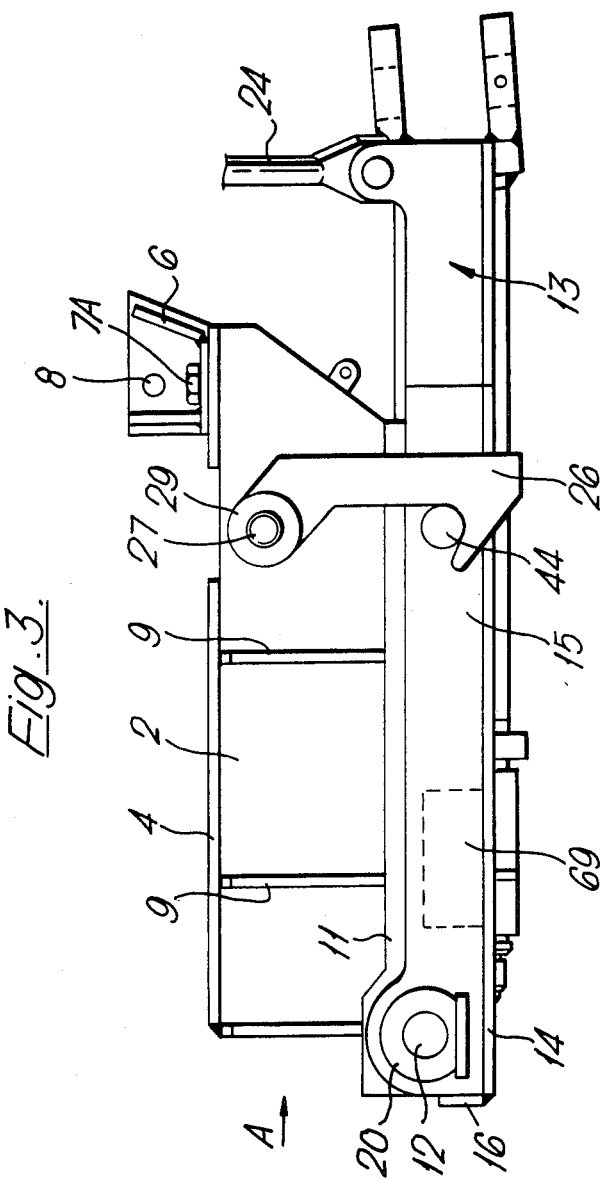

TRAILER COUPLING DEVICE

This invention relates to couplings for hitching a trailer to a towing vehicle, and especially where the towing vehicle is an agricultural tractor and the trailer attached to the tractor by partial superimposition.

The standard simple form of coupling between an agricultural tractor and a trailer which it is to tow comprises a hook at the rear of the tractor and an eye at the front of the trailer. The hook can be raised or lowered by hydraulic means controlled from the driving seat. In order to effect a coupling the driver must position the tractor accurately so that the hook is immediately below the eye, and then raise the hook to enter the eye. The necessary freedom for relative movement in pitch, roll and yaw of the trailer relative to the tractor is made possible by the looseness of the hook in the eye. This standard form of coupling is difficult to engage because the driver's view of the hook from the seat is normally obscured, the hook being low down and close in to the rear of the tractor.

Furthermore, with a two-wheeled trailer attached by partial superimposition, part of the vertical trailer load is transferred via the hook to the tractor. Since the hook is necessarily positioned behind the rear axle of the tractor, this transferred load has the effect of increasing the load on the tractor's rear wheels and reducing the load on the front wheels. Such a tendency of the front wheels to lift can have a very adverse effect on steering.

In order to overcome the latter difficulty there has been in use for some years a coupling known as the Poole hitch. The Poole hitch essentially consists of an upright pintle to the rear of the tractor carried by a frame which is pivoted only in the pitch plane at a position forward of the tractor rear axle. The pintle can be engaged in a corresponding female coupling on a trailer to be hitched in similar manner to the hitching of conventional hook and eye. However, the pintle coupling permits pivoting only in the roll and yaw planes, so that the superimposed trailer load is transferred to the tractor forward of the rear axle, and the steering is unimpaired by any tendency of the trailer to lift the front wheels. Nevertheless, the Poole hitch does have certain disadvantages. The pintle of the Poole hitch obscures the standard mechanical power take-off at the rear of the tractor, so that the power take-off cannot be used with trailed machinery. Considerable modification to the tractor is required, and the standard 3-point hitch facility cannot be used with the Poole hitch in place.

A need therefore exists for a trailer hitch for a partially superimposed trailer which can
  (i) place the superimposed vertical load of the trailer forward of the tractor rear axle.
  (ii) maintain freedom of movement between trailer and tractor in roll, pitch and yaw.
  (iii) permit use of a standard mechanical rear power take-off with trailed machinery.
  (iv) require relatively little modification to tractor or trailer.
  (v) permit use of standard 3-point hitch without removal of the tractor-mounted part of the coupling, and
  (vi) permit rapid coupling with improved visibility to the driver.

The present invention seeks to provide a coupling device which will enable these criteria to be met to a greater extent than is possible with prior art devices.

According to the present invention there is provided a coupling device comprising a main frame for attachment to the underside of a vehicle, a guideway attached to the frame and adapted to move downwardly to the frame when in position under the vehicle, the guideway being adapted to receive and guide along its length from its rearward end to a forward position a coupling member, and latching means for positively holding the coupling member to the main frame at the forward position.

Conveniently the latching means comprises one or more recesses between the guideway and the main frame and adapted to receive one or more complementary portions of the coupling member, the arrangement being such that when the guideway is moved downwardly relative to the main frame the one or more complementary portions can enter the one or more recesses, but when the guideway is moved to an upward position relative to the main frame, the recesses close to an extent at least sufficient to prevent the escape of the complementary portions therefrom.

Preferably the latching means includes a catch which can hold the guideway in the said upward position. Conveniently the catch comprises a hook on the main frame engageable with a projection on the guideway.

The invention further resides in a coupling device in accordance with the invention and attached to the underside of an agricultural tractor, the said forward position being forward of the tractor rear axle.

Conveniently hydraulic means are provided for raising and lowering the guideway. Control means for the hydraulic means can be provided which are actuable from the driving seat of the tractor.

Most desirably the guideway projects rearwardly from the tractor so as readily to be visible from the driving seat.

According to a further aspect of the invention the coupling device comprises a coupling member adapted to be attached in use at the forward end of a trailer.

Conveniently the guideway comprises a pair of mutually parallel rails and the coupling member includes a pair of blocks so spaced as to be capable of sliding along the guideway with one block located on each rail.

Preferably at the rearward end the guideway includes a rearwardly diverging portion which can guide the blocks into proper location with the parallel rails.

The coupling member can advantageously have a body portion upon which the blocks are pivotally mounted to permit relative rotation about a pitch (transverse horizontal) axis between the main frame and a trailer to which the coupling member is in use attached.

The body portion can advantageously comprise two parts pivotable one relative to the other to permit relative rotation about a roll (longitudinal) axis between the main frame and a trailer to which the coupling member is in use attached.

The body portion can conveniently include at its rearward end a connecting device adapted to be attached to a trailer, the body portion and the connecting device being pivotally connected to permit relative rotation about a yaw (vertical) axis between the main frame and a trailer to which the connecting device is in use attached.

The invention will now be described by way of example only with reference to the accompanying drawings, of which FIG. 1 is a plan view of a coupling device in accordance with the invention, for an agricultural tractor;

FIG. 2 is a sectional plan view of a part of the coupling device shown in FIG. 1;

FIG. 3 is a side elevational view of the coupling device of FIG. 1;

FIG. 4 is an end elevational view of the direction of arrow "A" of the coupling device shown in FIG. 3; and FIG. 5 is a sectional side elevational view of a connecting device for a trailer;

Figure 1:
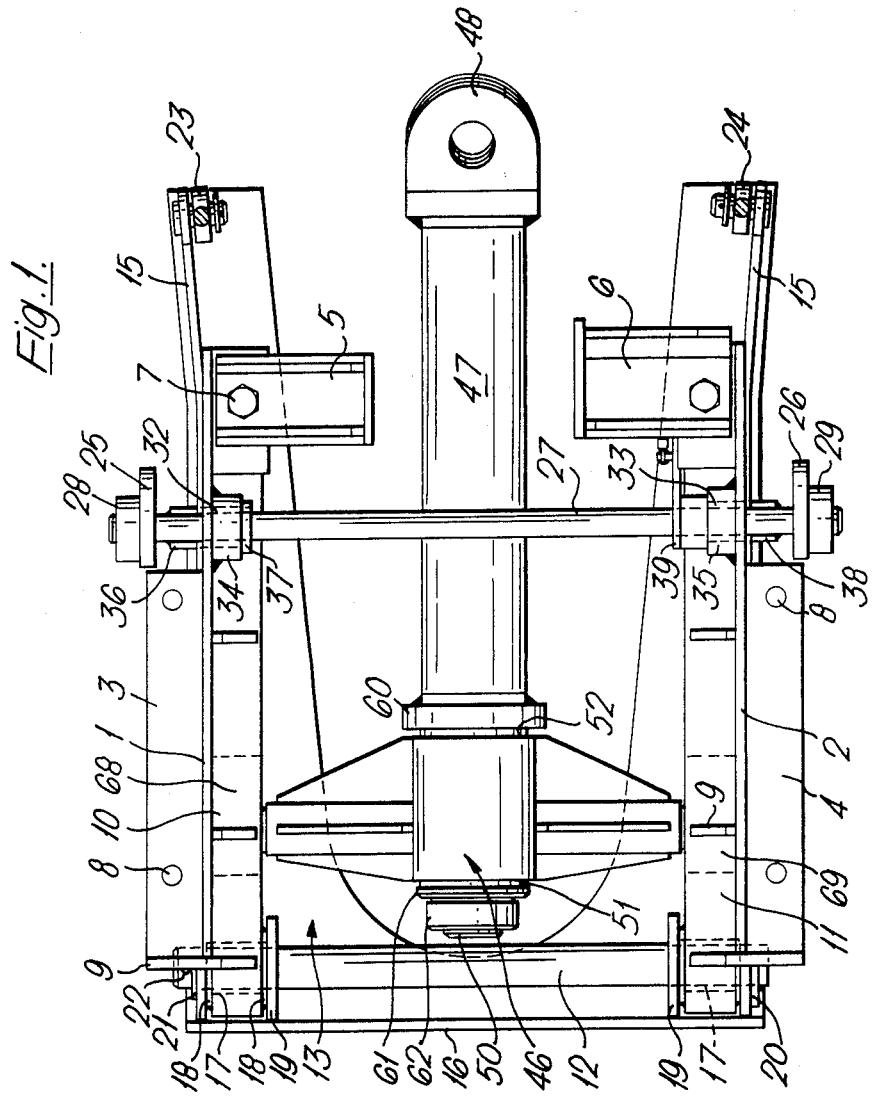

As shown in FIGS. 1 to 4, a coupling device for use in hitching an agricultural tractor and trailer together comprises a main frame consisting of a right hand frame member 1 and a left hand frame member 2, integral with the frame members 1 and 2 are respective brackets 3, 4 and further fabricated brackets 5, 6 are attached to the respective frame members by nuts 7 bolts 7A, and spring washers 7B. The brackets 3, 4, 5, 6 are provided with drilled holes 8 to facilitate fixing the frame members 1, 2 to the underside of an agricultural tractor.

Each frame member 1, 2 is provided with upright strengthening webs 9, and welded to the lower edges of the strengthening webs of each respective frame member are longitudinally extending rectangular box-section members 10, 11.

Pivotally attached to the main frame members 1, 2 at their forward ends by means of a pivot shaft 12 is a fabricated guideway 13. The guideway 13 comprises a base 14 of generally U-shape, and side-members 15 and a forward end-member 16 each welded to the base 14. The arms of the base 14, with the sides 15, define a pair of parallel rails, at their forward ends, and the side members diverge towards the rear. The pivot shaft 12 is supported in transverse bushes 17 inserted in the forward ends of the box-section members 10, 11, and spacers 18 are welded to the sides of these members adjacent the bushes. Upright webs 19 are welded to the base 14 and end-member 16. The pivot-shaft passes through journals in the sides 15 and the webs 19, which support the shaft and prevent lateral movement of the box-members 10, 11. The shaft 12 is kept in place by a washer 20 welded to one end thereof, and a washer 21 and grovelock pin 22 at the other end.

Pivotally attached to the respective frame members 1, 2 at their rearward ends are lift rods 23, 24 which can be raised and lowered by hydraulic means (not shown) controlled from the cab of the tractor.

The guideway 13 can be held in an upward position by means of a pair of hooks 25, 26 carried on a hook shaft 27. The hooks have respective bosses 28, 29 fixed thereto, eg by welding, and the bosses are anchored to the shaft 27 by means of respective grovelock pins 30, 31. The shaft 27 is journalled in bushes 32, 33 which are received in the main frame members 1 and 2 and bosses 34, 35 anchored thereto. Lateral movement of the shaft 27 is prevented by pairs of collars 36, 37 and 38, 39 welded to the shaft after assembly. The collar 39 has an arm 40 integral therewith, which carries a lug 41 to which one end of a return spring 42 is attached. The other end of the spring 42 is attached to a lug 43 which is fixed to the main frame member 2.

The hooks 25, 26 can engage grooved projections 44, 45 carried respectively on the left and right hand side members 15, to hold the guideway 13 in an upper position.

Slidably received within the guideway 13 is a towing arm assembly 46, comprising a tow bar 47 with clevis attachment 48, and a pivot assembly 49 shown in section in FIG. 2. The tow bar 47 includes at its forward end a stub shaft 50 which is journalled in bushes 51, 52 in the pivot assembly.

The bushes 51, 52 are a press-fit in a tubular part 53. The stub shaft 50 is retained in position by a collar 60 welded thereto, a nut 62 screwed to the end thereof, and spacing washer 61.

Blocks 54 are attached to the tube 53 by welded fillets 55, 56, 57, 58. Retained within a transverse bore in each block 54 by a grovelock pin (not shown) are respective stub shafts 59, 63. Rectangular blocks 64, 65 are journalled to the respective stub shafts 59, 63 by means of press-fit bushes 66. The blocks 64,65 are retained by enlarged heads 67 of the stub shafts 59, 63.

The spacing of the blocks 64, 65 is such that they can slide freely along the parallel portion of the guideway 13. Towards their forward ends, the box members 10, 11, are provided with rectangular cut-outs 68, 69 within which the respective blocks 64, 65 can be received. (The outlines of the cut-outs 68, 69, but not of the blocks 64, 65, are shown as hidden detail in FIGS. 1 and 3).

The clevis attachment 48 can be attached by means of a pin 70 to a clevis 71 which is attached permanently to a trailer (not shown). The pin 70 can be kept in place by split pins 72 (FIG. 5).

In use, the main frame members 1 and 2 are bolted permanently to the underside of a tractor 73 (FIGS. 6 and 7), and the tow bar 47 is attached to a trailer by the clevis and pin arrangement shown in FIG. 5, so that the blocks 64, 65 are kept clear of the ground.

In order to hitch the trailer to the tractor, the tractor is manoeuvred so that the flared rear ends of the guideway 13 are adjacent the blocks 64, 65 on the towing arm assembly 46. The hooks 25, 26 are disengaged from the projections 44, 45 by means of a control cable (not shown) actuated from the cab of the tractor, and the guideway is lowered by pivoting about the shaft 12 under the control of the lift rods 23, 24. The tractor is then reversed so that the flared rear part of the guideway is beneath the blocks 64, 65, and the guideway is lifted to some extent under control of the lift rods 23, 24. When the blocks are engaged in the guideway, the tractor is reversed further, and by virtue of the flared form of the guideway, the blocks are guided therein until they reach its forward end. At this point the blocks are positioned under the cut-outs 68, 69 in the box members 10, 11. The guideway is then fully raised under control of the lift rods, so that the blocks are held captive in the cut-outs 68, 69. As the guideway reaches its uppermost position, the hooks 25, 26 snap into position under the action of the spring 42 so that it is held positively against releasing the blocks. The guideway and cut-outs thus together constitute latching means by which the coupling member 49 can be held to the main frame 1, 2.

Figure 6:
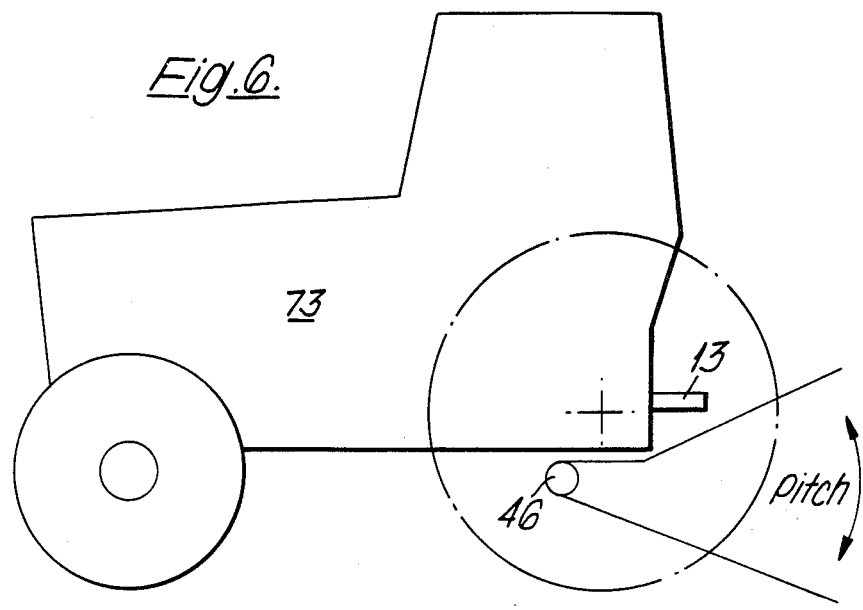
FIG. 6 is a diagrammatic side elevation of an agricultural tractor illustrating some aspects of the invention.
Figure 7:
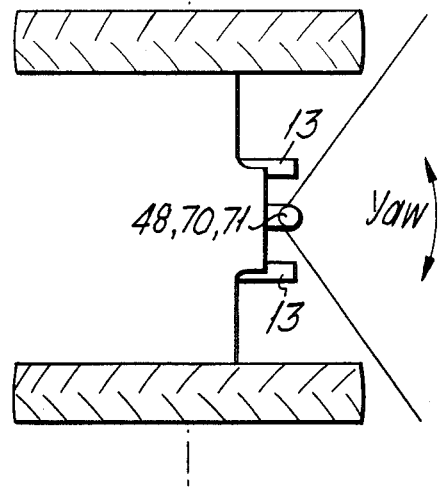
FIG. 7 is a diagrammatic plan view corresponding to FIG. 6 of the rear end of an agricultural tractor.

It will be appreciated that the entire manoeuvre of coupling the trailer has been readily accomplished from the cab. As shown in FIGS. 6 and 7, the guideway 13 projects rearwardly from beneath the tractor to such an extent that the driver has a clear view to guide the blocks into the guideway. Once they are engaged, the coupling action can be completed without the need for visibility from the cab.

As seen in FIG. 6, a substantial degree of pitch between tractor and trailer can be accommodated, and the pitch motion takes place about axis of the stub shafts 59, 63 which is forward of the tractor's rear axle. The vertical load imposed by a two-wheel trailer is thus carried by the tractor at this position, eliminating the tendency of the downward load imposed by the trailer to cause the front wheels to lift. Roll motion between tractor and trailer is fully accommodated by rotation of the stub shaft 50 in the bushes 51, 52. As shown in FIG. 7, a wide range of yaw motion between tractor and trailer is accommodated by the clevis connection 48, 70, 71, the yaw axis being displaced rearwardly from the pitch axis so that a large degree of yaw can be accommodated.

We claim:

1. A coupling device comprising:
   a main frame adapted for attachment to the underside of a vehicle,
   a detachable coupling member having complementary portions,
   a guideway attached to said main frame and adapted to move downwardly relative to said main frame when said main frame is in position under said vehicle, said guideway being adpated to receive and guide along its length from its rearward end, most distant from said vehicle, to its forward end, said detachable coupling member, and
   a latching means for positively holding said detachable coupling member to said main frame at said guideway's forward end, wherein said latching means includes defining at least one recess between said guideway and said main frame and adapted to receive at least one said complementary portion of said detachable coupling member, so that when said guideway is moved downwardly relative to said main frame, said complementary portion can enter a recess, but when said guideway is moved to upwardly relative to said main frame, the recesses closes to an extent at least sufficient to prevent the escape of said complementary portions therefrom.

2. A coupling device according to claim 1 wherein said latching means includes a catch which can hold said guideway in said upward position.

3. A coupling device according to claim 2 wherein said catch comprises a hook on said main frame engageable with a projection on said guideway.

4. A coupling device according to claim 1 wherein said main frame is adapted to be attached to the underside of an agricultural tractor, said forward position being forward of a rear axle of said tractor.

5. A coupling device according to claim 4 and including hydraulic means for raising and lowering said guideway.

6. A coupling device according to claim 5 further including a control means for operating said guideway which is actuable from the driving seat of said tractor.

7. A coupling device according to claim 6 wherein said guideway projects rearwardly from said tractor.

8. A coupling device according to claim 1 and including a detachable coupling member adapted to be attached in use at the forward end of a trailer.

9. A coupling device according to claim 8 wherein said guideway comprises a pair of mutually parallel rails and said detachable coupling member includes a pair of blocks so spaced as to be capable of sliding along said guideway, with one block located on each rail, to a latching position.

10. A coupling device according to claim 9 wherein at said rearward end said guideway includes a portion diverging toward said rearward end which guides said blocks into position with said parallel rails.

11. A coupling device according to claim 1 wherein said detachable coupling member is adapted to be attached in use at the forward end of a trailer, said detachable coupling member having a body portion upon which said blocks are pivotally mounted to permit relative rotation about a pitch axis between said main frame and a trailer to which said detachable coupling member is adapted for attachment.

12. A coupling device according to claim 11 wherein said body portion comprises two parts pivotable one relative to the other to permit relative rotation about a roll axis between said main frame and a trailer to which said detachable coupling member is adapted for attachment.

13. A coupling device according to claim 11 wherein said body portion includes at said rearward end a connecting device adapted to be attached to a trailer, said body portion and said connecting device being pivotally connected to permit relative rotation about a yaw axis between said main frame and said trailer to which said connecting device is in use attached.

14. A coupling device according to claim 1 wherein said detachable coupling member is adapted to be attached in use at the forward end of a trailer, wherein said guideway comprises a pair of mutually parallel rails and said coupling member includes a pair of blocks so spaced as to be capable of sliding along said guideway with one block located on each rail, and said guideway at said rearward end includes a diverging portion toward said rearward end, which can guide said pair of blocks into latching position with said parallel rails.

15. A coupling device according to claim 1 wherein said guideway comprises a pair of mutually parallel rails and said detachable coupling member includes a pair of blocks so spaced as to be capable of sliding along said guideway, with one block located on each rail, to a latching position.

* * * * *